United States Patent
Wang

(10) Patent No.: US 9,683,468 B2
(45) Date of Patent: Jun. 20, 2017

(54) CAMSHAFT POSITIONING

(71) Applicant: Ford Global Technologies, LLC, Dearborn, MI (US)

(72) Inventor: Yan Wang, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 367 days.

(21) Appl. No.: 14/313,585

(22) Filed: Jun. 24, 2014

(65) Prior Publication Data
US 2015/0369195 A1    Dec. 24, 2015

(51) Int. Cl.
| | |
|---|---|
| F02N 11/08 | (2006.01) |
| F01L 13/00 | (2006.01) |
| F02N 11/00 | (2006.01) |
| F02D 41/00 | (2006.01) |
| F02D 41/06 | (2006.01) |
| F02D 13/02 | (2006.01) |
| F02M 26/05 | (2016.01) |

(52) U.S. Cl.
CPC ...... *F01L 13/0015* (2013.01); *F02D 13/0219* (2013.01); *F01L 2013/113* (2013.01); *F02D 41/0002* (2013.01); *F02D 41/009* (2013.01); *F02D 41/062* (2013.01); *F02D 2013/0292* (2013.01); *F02D 2041/001* (2013.01); *F02D 2041/0092* (2013.01); *F02D 2200/101* (2013.01); *F02M 26/05* (2016.02); *F02N 11/00* (2013.01); *Y02T 10/18* (2013.01)

(58) Field of Classification Search
CPC ............. F01L 13/0015; F01L 2013/111; F01L 2013/113; F02D 13/0219; F02D 41/009; F02D 41/062; F02D 41/0002; F02D 2013/0292; F02D 2041/001; F02D 2041/0092; F02D 2200/101; F02N 11/00; F02N 11/08; F02M 26/05
USPC ........... 123/90.11, 90.15; 701/101, 102, 111, 701/113
See application file for complete search history.

(56) References Cited

U.S. PATENT DOCUMENTS

| | | | |
|---|---|---|---|
| 5,209,202 A | 5/1993 | Maurer et al. | |
| 6,955,145 B1 * | 10/2005 | McCabe | F01L 1/022 123/90.15 |
| 7,177,759 B2 * | 2/2007 | Nakamura | F01L 1/34 123/478 |
| 8,249,796 B2 * | 8/2012 | Rollinger | F02D 13/06 123/198 DB |
| 8,511,278 B2 * | 8/2013 | Hattori | F01L 1/352 123/321 |
| 8,548,716 B2 | 10/2013 | Wang et al. | |
| 8,897,989 B2 * | 11/2014 | Han | F01L 1/3442 123/508 |

(Continued)

OTHER PUBLICATIONS

Wang, Yan, "Camshaft Position Determination," U.S. Appl. No. 14/216,959, filed Mar. 17, 2014, 35 pages.

*Primary Examiner* — Hung Q Nguyen
*Assistant Examiner* — John Bailey
(74) *Attorney, Agent, or Firm* — Julia Voutyras; McCoy Russell LLP

(57) ABSTRACT

Various methods for operating a camshaft are provided. In one example, a method of operating a camshaft comprises: adjusting the camshaft based on a desired camshaft position, the desired camshaft position determined based on a camshaft position indicated by a camshaft sensor and a camshaft position indicated by a camshaft actuator.

10 Claims, 6 Drawing Sheets

(56) References Cited

U.S. PATENT DOCUMENTS

| | | | |
|---|---|---|---|
| 8,935,076 B2* | 1/2015 | Ide | F01L 1/185 123/90.15 |
| 9,284,891 B2* | 3/2016 | Mikawa | F02D 13/0238 |
| 9,347,341 B2* | 5/2016 | Matsuo | F02D 41/062 |
| 2005/0211207 A1* | 9/2005 | Urushihata | F01L 1/024 123/90.17 |
| 2006/0027197 A1* | 2/2006 | Tagami | F01L 1/022 123/90.17 |
| 2006/0096561 A1 | 5/2006 | Haffelder et al. | |
| 2008/0065307 A1* | 3/2008 | Tanaka | F01L 1/352 701/102 |
| 2008/0065308 A1* | 3/2008 | Tanaka | F01L 1/352 701/102 |
| 2008/0071463 A1* | 3/2008 | Tanaka | F01L 1/352 701/102 |
| 2008/0168959 A1* | 7/2008 | Katayama | F01L 1/34 123/179.3 |
| 2009/0025665 A1* | 1/2009 | Inoue | F01L 1/34 123/90.15 |
| 2009/0055085 A1* | 2/2009 | Inoue | F02D 13/0215 701/105 |
| 2009/0071425 A1* | 3/2009 | Inoue | F01L 1/34 123/90.15 |
| 2009/0265077 A1* | 10/2009 | Urushihata | F01L 1/34 701/103 |
| 2009/0276145 A1* | 11/2009 | Schafer | F01L 1/024 701/105 |
| 2010/0145592 A1* | 6/2010 | Yoo | F01L 1/022 701/102 |
| 2011/0144883 A1* | 6/2011 | Rollinger | F02D 13/06 701/102 |
| 2011/0185994 A1* | 8/2011 | Hayashi | F01L 1/3442 123/90.17 |
| 2012/0016565 A1* | 1/2012 | Ide | F01L 1/185 701/102 |
| 2012/0046851 A1* | 2/2012 | Hirata | F01L 1/34 701/102 |
| 2012/0143463 A1* | 6/2012 | Han | F01L 1/3442 701/102 |
| 2013/0068185 A1* | 3/2013 | Mikawa | F01L 1/04 123/90.17 |
| 2013/0080027 A1* | 3/2013 | Mikawa | F02D 13/0238 701/102 |
| 2013/0125847 A1* | 5/2013 | Wang | F01L 1/344 123/90.17 |
| 2013/0268179 A1 | 10/2013 | Wang et al. | |

* cited by examiner

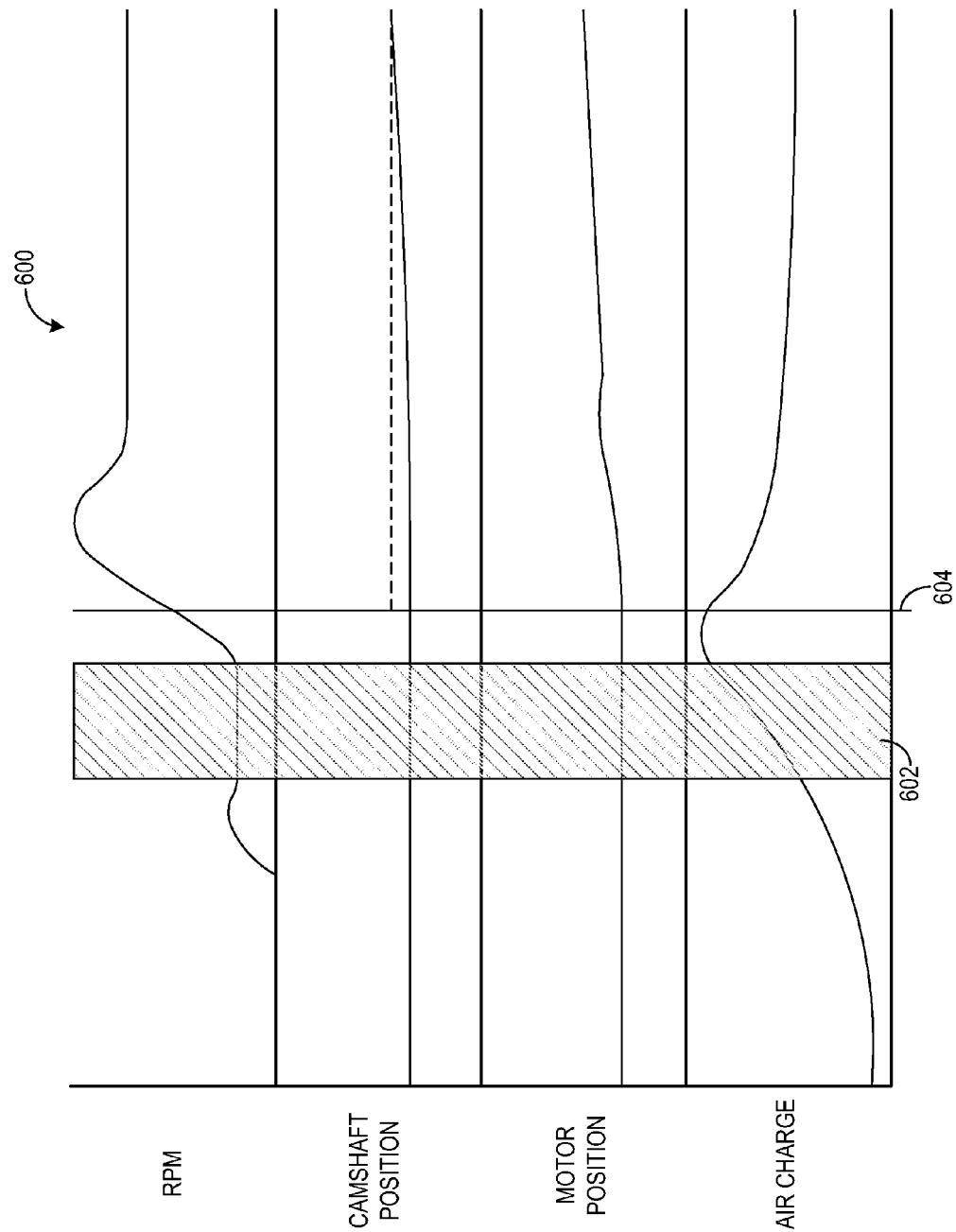

CAMSHAFT POSITIONING

FIELD

The field of the disclosure relates to engine control and identifying camshaft position for such control.

BACKGROUND AND SUMMARY

Engine controllers control many engine operational parameters such as air charge, fuel charge, exhaust gas recirculation, fuel vapor recovery, ignition timing, camshaft timing, valve timing, and so on. These parameters are controlled to achieve desired engine power while minimizing emissions.

Control of these parameters requires knowledge of camshaft position. Typically, a toothed wheel with one or more missing teeth is positioned on the camshaft and a detection of the passing teeth determines camshaft position.

Engine controls are more complicated in vehicles equipped with variable cam timing. Camshafts are driven by belt or chain couplings to the crankshaft. For engines equipped with variable cam timing (VCT), the timing or phase of the camshaft varies relative to the crankshaft. An electric motor or hydraulic actuator turns the camshaft relative to the crankshaft.

When an engine is being cranked during an engine start, detection of the passing cam teeth, or other detection method, may not provide accurate cam position measurement, which usually requires detection of several rising and falling edges. Nevertheless, a VCT actuator may phase the camshaft during cranking using position and/or velocity measurements obtained internally (e.g., using an encoder built into the actuator), and a default cam position relative to the crankshaft.

The inventors herein have recognized an issue with the approach identified above. Specifically, the default relative position between the camshaft and the crankshaft may become increasingly inaccurate over time, as wear occurs in various couplings between the camshaft and the crankshaft (e.g., from the crankshaft to a VCT actuator input shaft, from the actuator input shaft to a motor stator, from a motor rotor shaft to the camshaft, etc.). Consequently, the engine controller may not accurately determine cam position during engine cranking. Without accurately knowing cam position, any estimate of air charge in the combustion chamber may be in error and consequently the air/fuel charge may be inaccurate, possibly resulting in longer engine starts and higher emissions. Similar issues may occur with other controlled operating parameters.

The inventors herein have solved the above issues with a method of operating a camshaft, comprising in one example the following: adjusting the camshaft based on a desired camshaft position, the desired camshaft position determined based on a camshaft position indicated by a camshaft sensor and a camshaft position indicated by a camshaft actuator. By utilizing both camshaft positions indicated by the camshaft sensor and by the camshaft actuator, inaccuracy in camshaft positioning, particularly during engine cranking, may be mitigated. After engine cranking, when the engine has started, subsequently determined desired camshaft positions may be corrected based on differences between camshaft positions indicated by the camshaft sensor and those indicated by the camshaft actuator. Thus, the technical effect is achieved.

In one typical example, the camshaft is adjusted during engine cranking.

In another example, if output from the camshaft sensor is not sufficiently accurate, the camshaft position indicated by the camshaft sensor is a previously recorded camshaft position determined when output from the camshaft sensor was sufficiently accurate.

In yet another example, adjusting the camshaft includes sending the desired camshaft position from an engine controller to a motor controller of the camshaft actuator.

In still another example, the camshaft actuator is an electric motor.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 shows a graph illustrating operating parameters during a portion of an exemplary drive cycle of the engine of FIG. 1 operated according to the method of FIG. 3.

DETAILED DESCRIPTION

Internal combustion engines may be controlled based on a plurality of operating parameters including but not limited to air charge, fuel charge, exhaust gas recirculation, fuel vapor recovery, ignition timing, camshaft timing, valve timing, and so on. Specifically, in order to determine an appropriate amount of fuel to be injected into a cylinder, the amount of air inducted into the cylinder may also be determined. For engines in which the intake (and/or exhaust) valves are actuated via camshaft, the position of the camshaft is required when determining the inducted air. The position of the camshaft, however, may be unknown at certain phases of engine operation, for example during startup. In particular, a sensor configured to detect passing teeth as the camshaft undergoes rotation may be unable to report accurate readings until the engine has reached a high enough speed or turned a sufficient number of revolutions. As such, a relatively inaccurate last known cam position may be used which may differ significantly from an actual camshaft position, which may result in prolonged engine cranking and increased emissions. This problem may be exacerbated for engines equipped with variable cam timing (VCT). Nevertheless, a VCT actuator operable to alter the timing or phase of the camshaft may actuate the camshaft during cranking using position and/or velocity measurements obtained via an internal encoder and a default cam position relative to the crankshaft. This default relative position, however, may become increasingly inaccurate over time due to wear occurring in various couplings between the camshaft and the crankshaft (e.g., from the crankshaft to a VCT actuator input shaft, from the actuator input shaft to a motor stator, from a motor rotor shaft to the camshaft, etc.).

Figure 1:
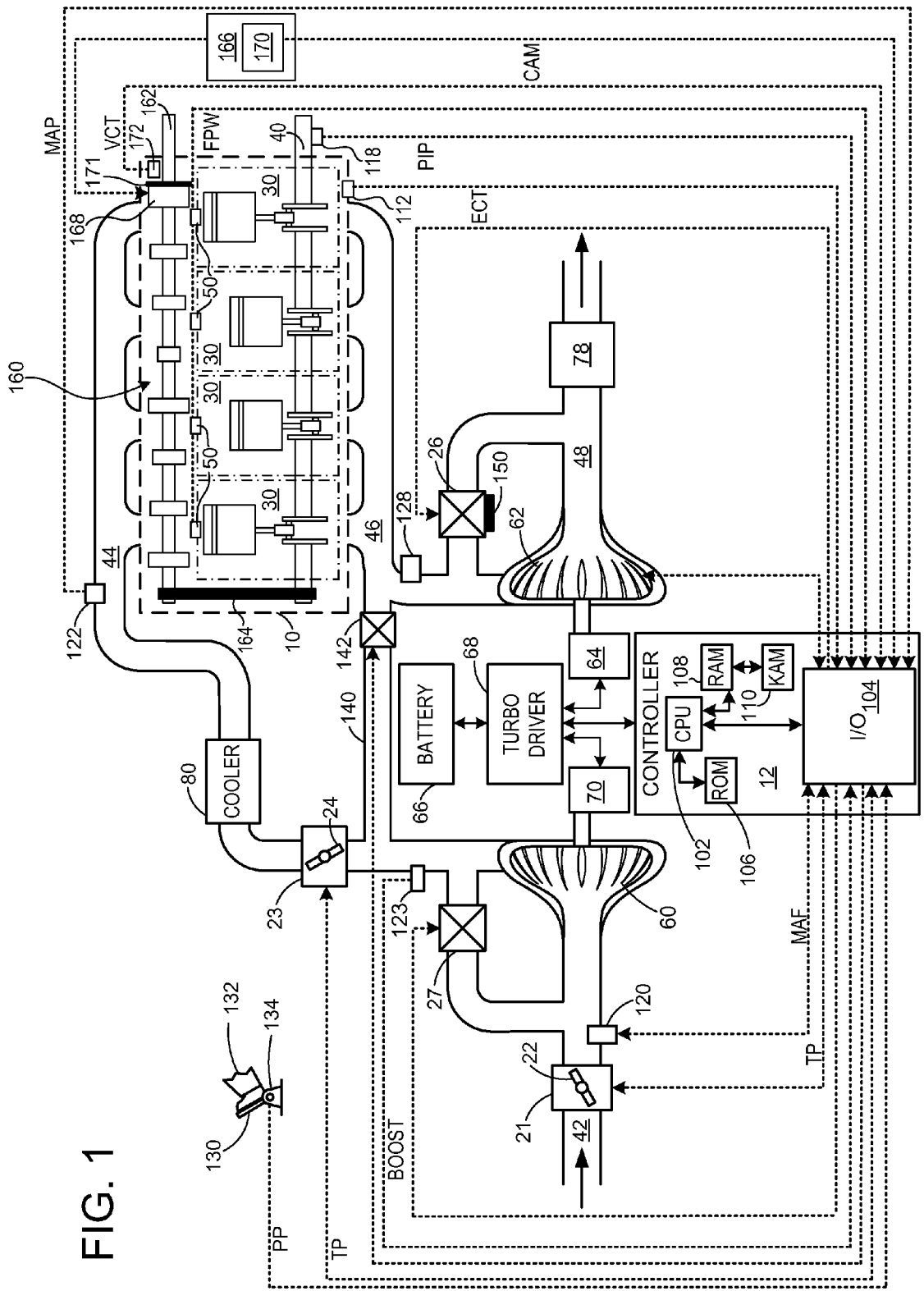
FIG. 1 shows a block diagram of a turbocharged engine including a camshaft.
Figure 2:
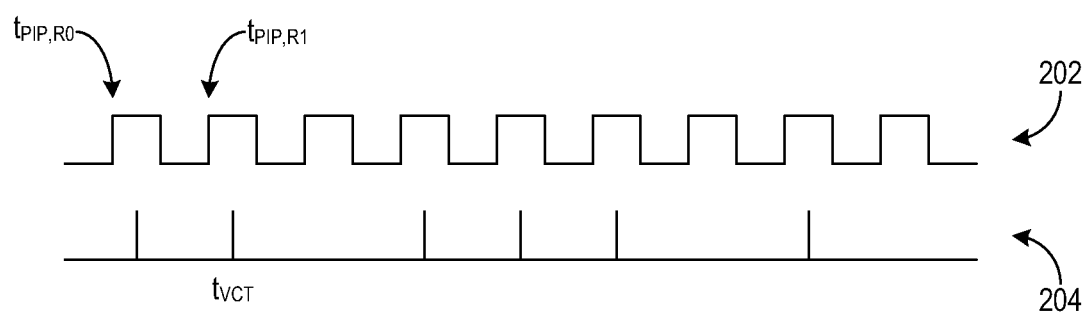
FIG. 2 illustrates an example of determining the orientation of a camshaft relative to a crankshaft, both of FIG. 1.
Figure 3:
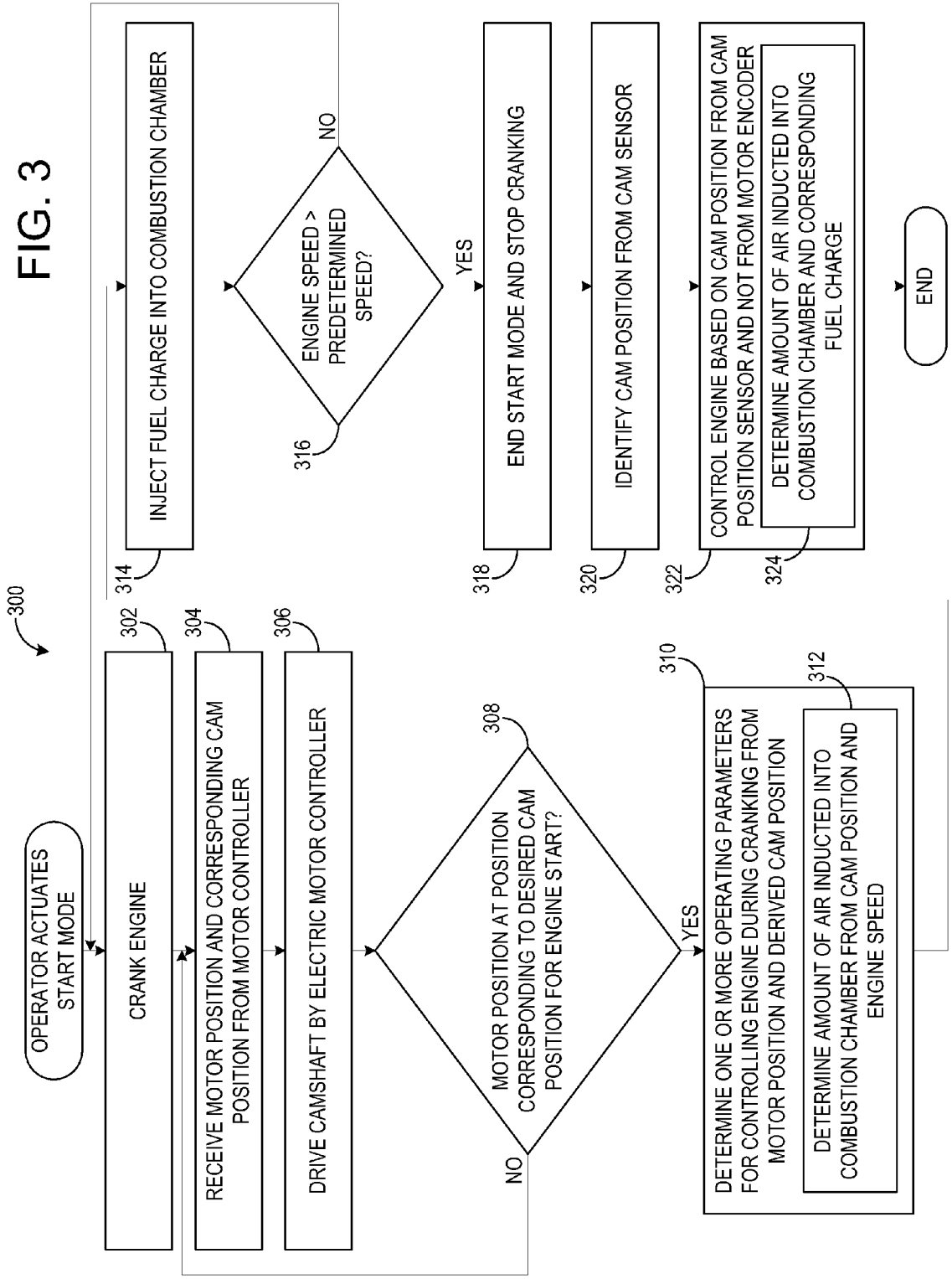
FIG. 3 shows a flowchart illustrating a method for controlling the engine of FIG. 1.
Figure 4:
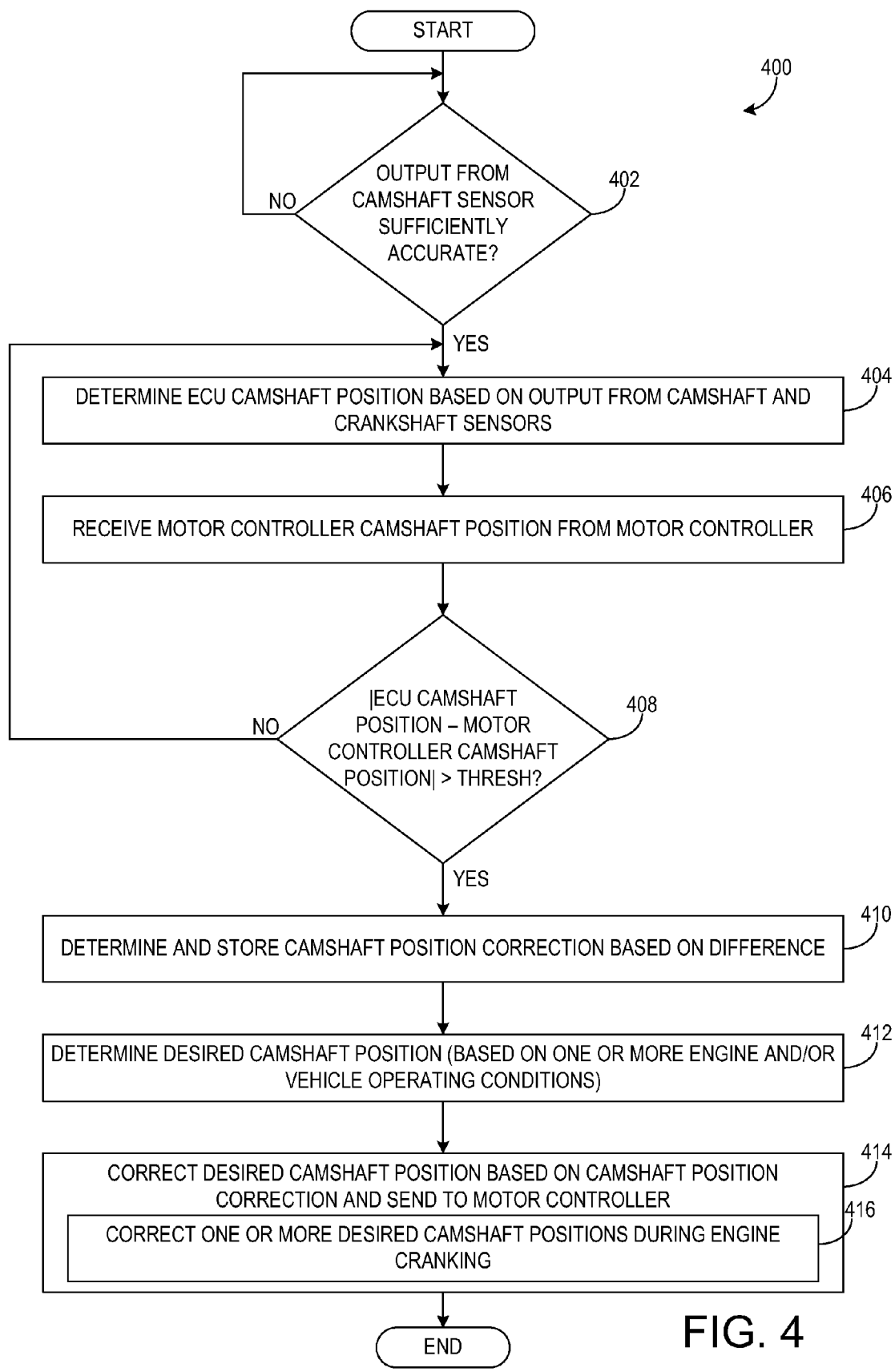
FIG. 4 shows a flowchart illustrating a method for correcting desired camshaft positions based on a difference between a motor controller camshaft position and an ECU camshaft position.
Figure 5:
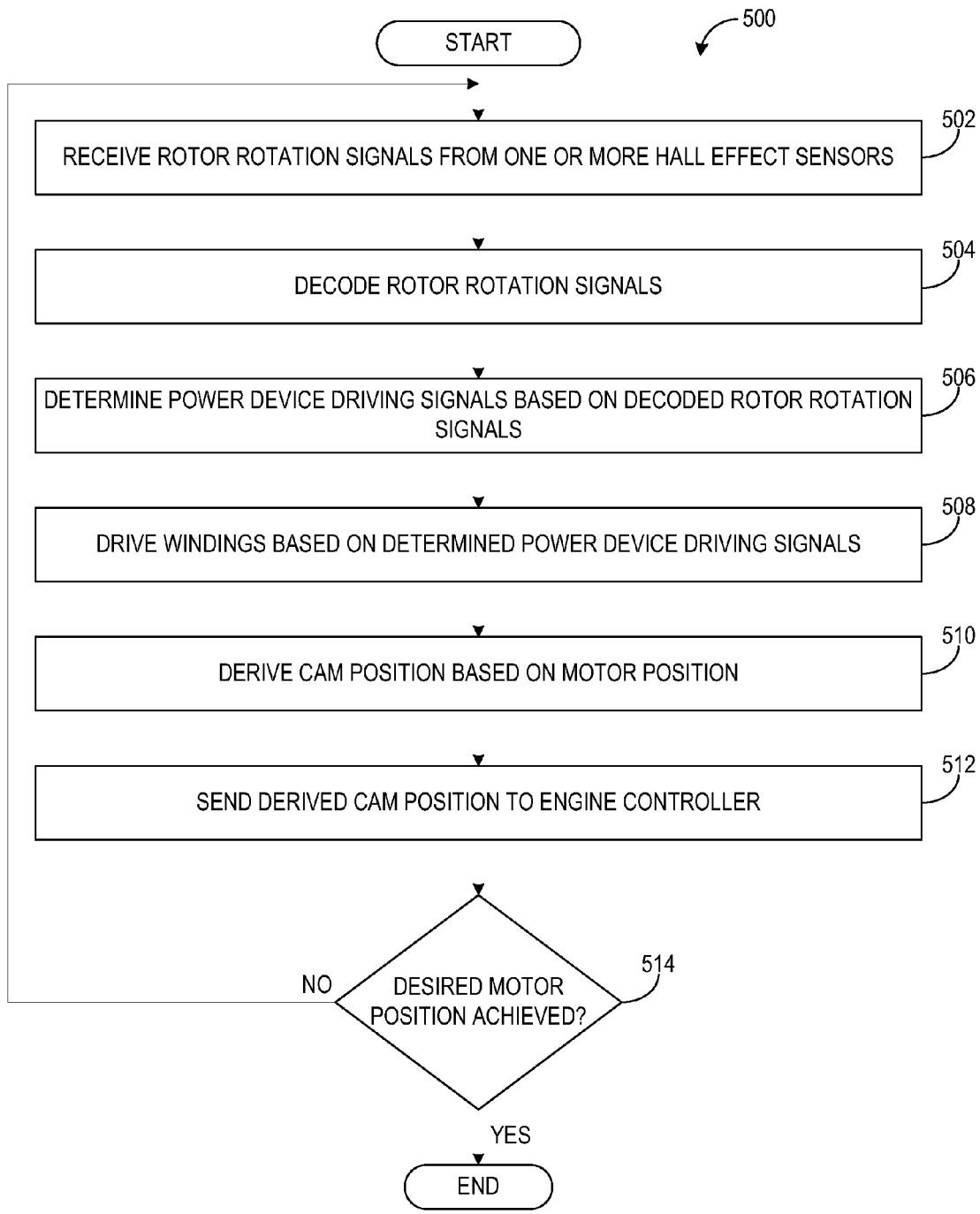
FIG. 5 shows a flowchart illustrating a method for controlling a brushless motor.

Various methods for operating a camshaft are provided. In one example, a method of operating a camshaft comprises: adjusting the camshaft based on a desired camshaft position, the desired camshaft position determined based on a camshaft position indicated by a camshaft sensor and a camshaft position indicated by a camshaft actuator. FIG. 1 shows a block diagram of a turbocharged engine including a camshaft; FIG. 2 illustrates an example of determining the orientation of a camshaft relative to a crankshaft, both of FIG. 1; FIG. 3 shows a flowchart illustrating a method for controlling the engine of FIG. 1; FIG. 4 shows a flowchart illustrating a method for correcting desired camshaft positions based on a difference between a motor controller camshaft position and an ECU camshaft position; FIG. 5 shows a flowchart illustrating a method for controlling a brushless motor; and FIG. 6 shows a graph illustrating operating parameters during a portion of an exemplary drive cycle of the engine of FIG. 1 operated according to the method of FIG. 3. The engine of FIG. 1 also includes a controller configured to carry out the methods depicted in FIGS. 3-5.

FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves. The intake and/or exhaust valves may be actuated (e.g., opened and closed) via respective cams 160 disposed on a camshaft 162 as the camshaft undergoes rotational motion.

Camshaft 162 may be coupled to crankshaft 40 via a linkage 164 (e.g., timing chain, belt, etc.), and may be further coupled to and driven by an electric motor 166, shown in FIG. 1 as being coupled to a drive gear 168 of the camshaft. Electric motor 166 may be operable to change the phase of camshaft 162 and accordingly the timing of the camshaft relative to crankshaft 40, in turn altering the timings at which the intake and/or exhaust valves are actuated to thereby optimize operation of engine 10 (e.g., increase engine output and/or decrease emissions). As such, electric motor 166 may be referred to as a VCT actuator or a camshaft actuator.

Electric motor 166 may be controlled via a motor controller 170, which may include suitable components (e.g., a logic subsystem) configured to facilitate variation of the phase of camshaft 162 and its timing relative to crankshaft 40. Electric motor 166 and motor controller 170 may be referred to in combination as a VCT electric-motor system. Electric motor 166 may indicate the position of a rotating component (e.g., shaft) housed inside or otherwise actuated by the motor, hereinafter referred to as a "motor position", and/or the position of camshaft 162 (e.g., a rotational orientation of the camshaft) which in some examples may be derived from the motor position. In some examples, the camshaft position may be controlled by controlling the relative position between a rotor and stator of electric motor 166. In this case, the stator may be mechanically linked to crankshaft 40 (e.g., via belts/chains), and the rotor may be mechanically linked to camshaft 162 via gears. By varying this relative position, the camshaft position relative to the crankshaft position may be changed, in turn altering cam position.

FIG. 1 shows motor controller 170 outputting the position of camshaft 162 as the CAM signal sent to an engine controller 12. As described in further detail below, the CAM signal may provide at certain times a more accurate indication of the position of camshaft 162 from which one or more engine operating parameters may be derived. In some embodiments, the CAM signal (and/or the motor position) may be relayed to controller 12 via a controller area network (CAN) bus. A plurality of components (e.g., actuators, controller 12, etc.) may be communicatively coupled to one another via a controller area network comprising the CAN bus, or another vehicle network. As described in further detail below, CAM signals received from motor controller 170 may be compared to camshaft positions determined by controller 12 based on output from a camshaft pulsewheel sensor to increase the accuracy of camshaft positioning.

Electric motor 166 may assume various suitable forms. In one example, electric motor 166 may be a brushless motor that can determine motor position by decoding signals from Hall Effect sensors. The Hall Effect sensors may be mounted in a stationary manner and configured to detect varying magnetic flux induced by passing rotation of one or more proximate permanent magnets mounted on a rotating portion (e.g., shaft) of the motor. Alternatively, the Hall Effect sensors may be mounted on the rotating portion of the motor and configured to detect induced magnetic flux resulting from rotation proximate one or more magnets placed in a fixed, stationary location. As one non-limiting example, three Hall Effect sensors spaced approximately 120° apart may be coupled to the shaft of electric motor 166. For embodiments in which electric motor 166 utilizes Hall Effect sensors to facilitate rotational sensing, motor controller 170 may turn the motor to a desired position via feedback control based on a motor position, determined from decoded signals outputted from the Hall Effect sensors, as well as the desired position. The decoded signals outputted from the Hall Effect sensors may be used as an indication of the position of camshaft 162. In some examples, the desired position may be determined relative to the position (e.g., rotational orientation) of crankshaft 40, an indication of which may be received via signals outputted from controller 12. These signals may be relayed via the CAN bus described above.

In other embodiments, rotational sensing in electric motor 166 may be carried out via a rotational encoder or by measuring back-EMF. Determination of absolute motor position may be accordingly suited to the configuration of electric motor 166. As one-non limiting example, a potentiometer whose resistance varies with angular position may be employed to determine the absolute rotational orientation of the VCT actuator. Such a potentiometer is one example of an internal encoder that may be included in electric motor 166 to determine its rotational orientation. In some embodiments, motor controller 170 may receive signals indicating the rotational orientation of crankshaft 40 from controller 12 to discern the rotational orientation of camshaft 162.

In still other embodiments, electric motor 166 may be a stepper motor. Here, motor controller 170 may provide multiple voltage phases to electric motor 166 to thereby turn the motor to a desired position via open-loop control, for example. More specifically, controller 12 may generate three signals at different phases to turn the stepper motor via open-loop control to thereby achieve the desired position, and may leverage the generation of the three signals as an indication of the position of camshaft 162.

Regardless of the configuration employed by electric motor 166, the camshaft position indicated by the motor is related to the timing and duration of the opening of an intake valve coupled to a combustion chamber 30. As such, the camshaft position may be used to determine one or more operating parameters according to which engine 10 may be operated. For example, controller 12 may determine the amount of air inducted into combustion chambers 30 from the intake valve timing and duration derived from the camshaft position. An appropriate fuel charge to be injected may then be determined based on the inducted air to thereby increase engine output and decrease emissions. Throughout engine operation, controller 12 may also provide motor controller 170 with desired motor positions corresponding to desired camshaft positions.

It will be appreciated that the camshaft configuration shown in FIG. 1 is provided as an example and is not intended to be limiting. In some embodiments, a camshaft operable to control opening of one of the intake and exhaust valves may be provided. Further, two camshafts may be provided for other cylinder configurations that the one shown in FIG. 1, such as V-6, V-8, V-10, or V-12 cylinder configurations, for example.

Engine 10 may include additional mechanisms with which rotation of camshaft 162 may be sensed. Particularly, a pulsewheel 171 may be coupled to camshaft 162 and positioned proximate drive gear 168. Pulsewheel 171 may include a plurality of teeth whose rotation may be sensed via a camshaft sensor 172, which may be a variable reluctance sensor (VRS) such as a Hall Effect sensor. The number of teeth positioned on pulsewheel 171 may vary depending on the number of cylinders in the engine; three teeth may be included for four cylinders, four teeth for six cylinders, and five teeth for eight cylinders, for example. In general, the angular separation with which the teeth are spaced controls the temporal spacing between pulses in a pulsetrain generated by camshaft sensor 172 as pulsewheel 171 rotates. Such pulses may be relayed to controller 12 as the VCT signal shown in FIG. 1. More specifically, the teeth may be unequally spaced such that some teeth are positioned close to one another while other teeth are positioned relatively farther away from one another. The pulsewheel may be said to have a "missing tooth" in the areas of greater (or greatest) angular separation. Unequal temporal spacings among pulses in a pulsetrain will result, allowing at least one tooth to be distinguished from the others. This tooth may correspond to a particular orientation of camshaft 162, such as the TDC position of the first cylinder 30 in a firing sequence. In some examples, output from camshaft sensor 172 may be used to determine the absolute position of electric motor 166. For example, motor rotation angles derived from output from camshaft sensor 172 may be translated to absolute movement of camshaft 162 based on a known gear ratio of electric motor 166 to the camshaft.

Pulsetrains generated by camshaft sensor 172 may be compared with pulsetrains generated by a crankshaft sensor 118, which may employ a similar mechanism to sense crankshaft rotation. In one example, sensor 118, which may also used as an engine speed sensor, may produce a predetermined number of equally spaced pulses every revolution of the crankshaft 40. Such pulses may be relayed to controller 12 as a profile ignition pickup signal (PIP). In particular, determining time durations between a VCT pulse and proximate PIP pulses may yield an indication of camshaft orientation relative to the crankshaft in degrees. As one non-limiting example, this relative camshaft orientation may be determined via the following formula: $\theta_{camshaft}=(720(t_{VCT}-t_{PIP,R1}))/((n)*(t_{PIP,R1}-t_{PIP,R0}))$, where $t_{VCT}$ is the time at which the VCT pulse occurred, $t_{PIP,R1}$ the time of occurrence of the rising edge of an immediately previous PIP pulse, n the number of cylinders in the engine, and $t_{PIP,R0}$ the time of occurrence of the rising edge of a PIP pulse immediate previous the first PIP pulse.

FIG. 2 illustrates an example of determining the orientation of a camshaft relative to a crankshaft, and may particularly illustrate a method by which the rotational orientation of camshaft 162 relative to crankshaft 40 may be determined, for example. A pulsetrain 202 generated by crankshaft sensor 118, and a pulsetrain 204 generated by camshaft sensor 172 are shown. Pulsetrain 202 comprises a plurality of equally spaced pulses, while pulsetrain 204 comprises a plurality of asymmetrically spaced pulses due to the angular placement of teeth on pulsewheel. $t_{VCT}$ marks the occurrence of a particular VCT pulse which may identify the TDC of the first cylinder in a firing sequence, for example. FIG. 2 also shows the occurrence of rising edges of respective PIP pulses ($t_{PIP,R0}$ and $t_{PIP,R1}$), which, along with $t_{VCT}$, may be used to determine the orientation of camshaft 162 relative to crankshaft 40 using the formula provided above. It will be appreciated, however, that pulsetrains 202 and 204 are provided as examples and are not intended to be limiting in any way. The pulsetrains particularly depict engine operation under steady state conditions.

During certain operating conditions, output from camshaft sensor 172 may be unavailable or insufficiently accurate to facilitate determination of the position of camshaft 162 relative to crankshaft 40. This may be the case during engine cranking, for example, due to the low update rate of readings from camshaft sensor 172. As such, electric motor 166 may position camshaft 162 at a desired rotational orientation during such conditions based on position and/or velocity measurements obtained via an internal encoder (e.g., potentiometer whose resistance changes with angular position), and a default or designed relative position between crankshaft 40 and camshaft 162. However, long-term wear occurring in various couplings (e.g., from the crankshaft to a VCT actuator input shaft, from the actuator input shaft to a motor rotor shaft, from a motor rotor shaft to the camshaft, etc.) between crankshaft 40 and camshaft 162 may alter this default relative position and particularly render it increasingly inaccurate. Suboptimal engine operation may result as a consequence of inaccurate camshaft positioning due to change in the default relative position.

To compensate for change in this default relative position, controller 12 may receive and compare camshaft positions indicated by motor controller 170 (e.g., CAM signals), referred to herein as "motor controller camshaft positions" and camshaft positions determined based on output from camshaft sensor 172 (e.g., VCT signals) relative to output from crankshaft sensor 118, referred to herein as "ECU camshaft positions". In particular, this comparison may take place iteratively throughout engine operation, once output from camshaft sensor 172 is sufficiently accurate (e.g., after completion of engine cranking) A difference between a motor controller camshaft position and an ECU camshaft sensor above a threshold may be stored (e.g., in ROM 106) so that subsequent desired camshaft positions may be corrected based on this difference. Specifically, a desired camshaft position determined by controller 12 may be corrected based on the difference, the corrected desired camshaft position then being relayed to motor controller 170 to enable camshaft 162 to be positioned at the corrected desired camshaft position. Correction of desired camshaft positions in this manner may be particularly beneficial during instances in which output from camshaft sensor 172 is insufficiently accurate (e.g., during engine cranking), as a potentially inaccurate default relative position between camshaft 162 and crankshaft 40 need not be relied upon. In this example, camshaft positioning may be corrected during engine cranking based on a correction determined and stored prior to engine cranking—e.g., during a previous drive cycle and before an engine shutdown preceding the current cranking. In this way, the suboptimal engine operation resulting from inaccurate camshaft positioning during cranking may be mitigated. FIG. 4 shows a method 400 described below for correcting camshaft positioning in this manner.

Returning to FIG. 1, fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120, a manifold air pressure sensor 122, and a throttle inlet pressure sensor 123 for providing respective signals MAF (mass airflow) MAP (manifold air pressure) to controller 12.

Exhaust passage 48 may receive exhaust gases from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof.

Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; the PIP signal from crankshaft sensor 118 (e.g., Hall Effect sensor or other type) coupled to crankshaft 40, as discussed; the VCT signal from camshaft sensor 172, as discussed; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48 and communicate with exhaust gasses flowing therethrough. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which may be an electric or a pneumatic actuator, for example. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Turning now to FIG. 3, a flowchart illustrating a method 300 for controlling the engine of FIG. 1 is shown. In particular, method 300 may enable control of engine 10 of FIG. 1 in part based on camshaft positions received by engine controller 12 from motor controller 170 via the CAM signal.

The method may be initiated when a vehicle operator actuates an engine start mode, for example upon occurrence of a key-on event.

The method may include, at 302, cranking the engine, which may include actuating a starter motor coupled to a crankshaft of the engine to initiate crankshaft rotation.

Next, the method may include, at 304, receiving a motor position and a corresponding camshaft position from a motor controller (e.g., motor controller 170 of FIG. 1), which may be associated with an electric motor (e.g., motor 166) operable to change the phase of a camshaft (e.g., camshaft 162). As described above, the motor position may indicate the rotational orientation of the motor and may provide a basis for derivation of the camshaft position. The motor and/or corresponding camshaft position may be relayed to the engine controller via the CAM signal described above.

Next, the method may include, at 306, driving the camshaft by the electric motor controller. The electric motor controller may drive the camshaft to achieve a desired camshaft position that may be determined by the engine controller based on one or more engine and/or vehicle conditions and sent to the motor controller. Accordingly, method may include, at 308, determining whether the motor position is at a position corresponding to the desired camshaft position for starting the engine. If the motor position is at the position corresponding to the desired camshaft position (YES), the method proceeds to 310. If the motor position is not at this position (NO), the method returns to 308. For embodiments in which the motor controller controls a brushless motor sensing rotation via Hall Effect sensors, decoded signals outputted from the Hall Effect sensors may be analyzed to determine whether this position has been reached, as described above.

Next, the method may include, at 310, determining one or more operating parameters for controlling the engine during cranking, the one or more operating parameters determined from the motor position and a derived camshaft position. The derived camshaft position may be derived from the motor position in the manners described above. As part of determining the one or more operating parameters for controlling the engine during cranking, the method may include, at 312, determining, from the derived camshaft position and the instant speed of the engine, an amount of air inducted into a combustion chamber. As this quantity of air may be highly dependent on intake valve timing and thus camshaft position, a more accurate estimate of inducted air may be obtained by determining camshaft position from the motor position.

Next, the method may include, at 314, injecting a fuel charge into the combustion chamber. The quantity of fuel injected may be determined based on the amount of air inducted into the combustion chamber determined at 312. As such, the fuel charge may be optimized for engine operating conditions, which may increase engine output and/or decrease emissions.

Next, the method may include, at 316, determining whether the current speed of the engine exceeds a predetermined speed. The predetermined speed may correspond to a threshold above which engine speeds are sufficient to end cranking. Accordingly, if the engine speed exceeds the predetermined speed (YES), the method proceeds to 318. If the engine speed does not exceed the predetermined speed (NO), the method returns to 302.

Next, the method may include, at 318, ending the start mode and stopping cranking. A period referred to as "after cranking" may include a period after a first combustion event (e.g., firing of a first cylinder in a cylinder firing sequence) extending from the rest of engine cranking, and further after both the crankshaft and camshaft sensors have been validated (e.g., their output is of sufficient quality to be used to determine one or more engine operating parameters as explained above with reference to FIG. 2).

Next, the method may include, at 320, identifying the camshaft position from a camshaft sensor (e.g., camshaft sensor 172). The camshaft position may be identified based on the VCT signal shown in FIG. 1, for example.

Next, the method may include, at 322, controlling the engine based on the camshaft position sensed via the camshaft sensor and not based on the camshaft position sensed via the motor encoder (e.g., Hall Effect sensors, rotary encoder, etc.). In engine 10 of FIG. 1, camshaft positions sensed via motor controller 170 and relayed via CAM signals may subsequently be sensed via camshaft sensor 172 and VCT signals. Handing off camshaft position sensing in this manner may be performed, as, in some embodiments, a pulsewheel may provide higher resolution position sensing than several Hall Effect sensors. In some scenarios, a difference may exist between a camshaft position provided via the motor controller and a camshaft position provided via the camshaft sensor. The camshaft position provided via the camshaft sensor may be chosen to resolve the difference, though in other examples the difference may be resolved by selecting the camshaft position provided via the motor controller, or performing suitable averaging and/or filtering.

The method may further include as part of engine control at 322 determining an amount of air inducted into a combustion chamber and a corresponding fuel charge after the start mode based in part from a camshaft position provided from the camshaft sensor at 324. In this way, the accuracy with which air induction and corresponding fuel charges is determined may be increased by estimating air induction using camshaft positions derived from motor positions during the start mode, and using camshaft positions derived from the camshaft sensor after the start mode. Thus, camshaft positions derived from a VCT electric-motor system may be used to adjust fuel injection during engine cranking, while different camshaft positions indicated from camshaft and crankshaft sensors may be used to adjust fuel injection after cranking Adjusting fuel injection herein may include adjustment based on estimated air charge, which may be based on at least one of a mass airflow sensor (e.g., sensor 120 of FIG. 1) and a manifold pressure sensor (e.g., sensor 122 of FIG. 1). The estimated air charge may be further estimated based on a camshaft position indicated from the VCT electric-motor system during engine cranking and from a different camshaft position after cranking.

It will be appreciated that method 300 may be modified in various suitable manners. In some embodiments, camshaft positions may be identified from the motor controller and not the camshaft sensor after the start mode has ended and cranking has stopped. In other embodiments, camshaft positions may be continually relayed to the engine controller from the motor controller even if the engine is controlled based on camshaft positions sensed via the camshaft sensor. In some embodiments, both camshaft positions received from the motor controller and the camshaft sensor may be used to control the engine.

Further, a desired cam timing may be sent to the VCT electric-motor system based on operating conditions and the crankshaft sensor. Sending of the desired cam timing may be performed after engine cranking, and during or before cranking the sending of the desired cam position may be based on the VCT electric-motor system camshaft position communicated via a vehicle network (e.g., CAN). Sending of the desired cam position may also occur via the vehicle network.

FIG. 4 shows a flowchart illustrating a method 400 for correcting desired camshaft positions based on a difference between a motor controller camshaft position and an ECU camshaft position. Method 400 may be stored as machine-readable instructions on controller 12, and may be executable by CPU 102, for example. Further, method 400 may be employed to correct positioning of camshaft 162 based on differences between camshaft positions determined based on output from motor controller 170 and camshaft positions determined based on output from camshaft sensor 172 and crankshaft sensor 118.

At 402 of the method, it is determined whether output from a camshaft sensor is sufficiently accurate. Output from the camshaft sensor may be considered sufficiently accurate if the output, along with other data such as output from a crankshaft sensor, can be used to determine the position of a camshaft. As the accuracy of output from the camshaft sensor may be at least partially dependent on engine speed, it may be determined whether the speed of an engine exceeds a threshold speed. Alternative or additional conditions may be assessed, however, such as whether an update rate of output from the camshaft sensor exceeds a threshold. If it is determined that output from the camshaft sensor is not sufficiently accurate (NO), the method returns to 402. If it is determined that output from the camshaft sensor is sufficiently accurate (YES), the method proceeds to 404.

Next, at 404 of the method, an ECU camshaft position is determined based on output from the camshaft sensor and the crankshaft sensor. The ECU camshaft position may be determined in the manner described above with reference to FIG. 2; for example, determination of the ECU camshaft position may include a temporal comparison of camshaft sensor output and crankshaft sensor output.

Next, at 406 of the method, a motor controller camshaft position is received from a motor controller of an electric motor configured to phase the camshaft. As described above, the motor controller camshaft position may be determined at least partially based on output from an internal encoder of the motor controller.

Next, at 408 of the method, it is determined whether a difference between the absolute value of the ECU camshaft position and the motor controller camshaft position exceeds a threshold difference. Here, differences between these camshaft positions that exceed the threshold difference prompt correction of wastegate positioning that otherwise may be significantly inaccurate. If it is determined that the difference between the absolute value of the ECU camshaft position and the motor controller camshaft position does not exceed the threshold difference (NO), the method returns to 404. If it is instead determined that the difference between the absolute value of the ECU camshaft position and the motor controller camshaft position does exceed the threshold difference (YES), the method proceeds to 410.

At 410 of the method, a camshaft position correction is determined and stored based on the difference determined at 408. The correction may be stored in ROM 106 of FIG. 1, for example. In some examples, the camshaft position correction may be a constant proportional to the difference. Storage of the correction facilitates retrieval of the correction and correction of camshaft positioning during operating conditions for which a correction cannot be derived—e.g., at times during which output from the camshaft and/or crankshaft sensor is unavailable or insufficiently accurate. For example, a correction may be determined and stored during a first drive cycle. An engine shutdown may terminate the first drive cycle and a subsequent engine startup may initiate a second drive cycle following the first drive cycle. During the second drive cycle (e.g., during engine cranking), the correction determined during the first drive cycle may be retrieved, allowing correction of desired camshaft positions determined during the second drive cycle.

Next, at 412 of the method, a desired camshaft position is determined based on one or more engine and/or vehicle operating conditions. The desired camshaft position may be selected to increase engine output and/or decrease emissions, and may be determined at least in part based on driver-requested torque, for example.

Finally, at 414 of the method, the desired camshaft position determined at 412 is corrected based on the camshaft position correction determined at 410. In some examples, correction may include adding or subtracting the camshaft position correction to the desired camshaft position. The corrected desired camshaft position is then sent to the motor controller to drive camshaft positioning at the corrected position. Desired camshaft position correction may include, at 416, correcting one or more desired camshaft positions during engine cranking following determination of the camshaft position correction at 410. For example, a camshaft position correction may be determined during a drive cycle throughout which desired camshaft positions may be corrected based on the correction. The correction may be stored so that, after an engine shutdown and subsequent startup initiating a new drive cycle, desired camshaft positions determined during the new drive cycle, and particularly those determined during cranking, may be corrected based on the stored correction. In this way, the issues described above resulting from inaccurate camshaft positioning during cranking may be mitigated by obviating the need for the motor controller to rely on a default relative position between the camshaft and crankshaft.

It will be appreciated that the steps of method 400 shown in FIG. 4 may be performed on an iterative basis such that desired camshaft positions may be continually corrected throughout engine operation. Moreover, method 300 of FIG. 3 may be modified to leverage the desired camshaft position correction carried out via execution of method 400. For example, prior to driving the camshaft by the electric motor controller at 306, a desired camshaft position may be determined and then corrected based on a difference between a motor controller camshaft position and an ECU camshaft position as described above. Correction may include retrieving a stored correction. Method 300 may proceed as depicted in FIG. 3 until completing step 324, following which a camshaft position may be received from a motor controller (e.g., via the CAM signal received from motor controller 170). It may then be determined whether a difference between the motor controller camshaft position and the ECU camshaft position determined prior to 306 exceeds a threshold, and if so, updating and storing the correction, and finally correcting subsequently determined desired camshaft positions via the updated correction. In some examples, motor controller and ECU camshaft positions may be iteratively compared and corrections appropriately derived throughout engine operation as described above. Thus, an engine may be controlled based on both motor controller and ECU camshaft positions and not based exclusively on one or the other.

FIG. 5 shows a flowchart illustrating a method 500 for controlling a brushless motor. Method 500 may be used to control electric motor 166 for embodiments in which the motor is a brushless motor, for example. The method may also be used to derive camshaft positions from motor positions for use by an engine controller (e.g., controller 12 of FIG. 1).

The method may include, at 502, receiving rotor rotation signals from one or more Hall Effect sensors. As described above, the Hall Effect sensors may be mounted in a stationary, fixed location and configured to detect rotation of the rotor based on changes in magnetic flux induced by passing rotation of proximate magnets mounted to a rotating portion (e.g., shaft) of the motor, though embodiments in which the Hall Effect sensors are coupled to the rotating portion with the magnets placed in a fixed location are also contemplated.

Next, the method may include, at 504, decoding the rotor rotation signals received at 502. In some embodiments, each rotor rotation signal may be a binary signal assuming one of two values (e.g., on or off/0 or 1). Decoding the rotor rotation signals may thus include employing binary decoding to determine which of the one or more Hall Effect sensors are on (e.g., outputting 1).

Next, the method may include, at 506, determining power device driving signals based on the decoded rotor rotation signals decoded at 504. In some examples, each decoded rotor rotation signal may be associated with one or more power device driving signals in a suitable data structure (e.g., a lookup table) such that appropriate driving signals may be determined upon decoding the rotation signals.

Next, the method may include, at 508, driving windings of the motor based on the power device driving signals determined at 506. The motor may include a plurality of power devices each electrically coupled to one or more windings of the motor. Driving the power devices may thus enable the supply of electrical current to their associated windings, in turn inducing rotational motion in the motor to achieve a desired position (e.g., rotational orientation).

Next, the method may include, at 510, deriving a camshaft position based on a motor position. The motor position may be an absolute rotational orientation of the motor, and may be determined in various suitable manners—for example, via an encoder including a potentiometer whose resistance varies with angle. In some examples, the motor position may be alternatively or additionally derived from a position of a crankshaft (e.g., crankshaft 40 of FIG. 1) coupled to the camshaft (e.g., camshaft 162) actuated by the motor. The camshaft position may then be derived based on the motor position in the manners described above.

Next, the method may include, at 512, sending the camshaft position derived at 510 to the engine controller. One or more operating parameters for controlling an engine may be determined based on the derived camshaft position as described above and shown in FIG. 3.

Finally, the method may include, at 514, determining whether a desired motor position has been achieved. The desired motor position may have been sent to the motor controller from the engine controller, for example. If the desired motor position has been achieved (YES), the method ends. If the desired motor position has not been achieved (NO), the method returns to 502.

FIG. 6 shows a graph 600 illustrating operating parameters during a portion of an exemplary drive cycle of engine 10 of FIG. 1 operated according to method 300 of FIG. 3. As shown, the operating parameters in this example include engine speed (RPM), motor position (e.g., as indicated by motor controller 170 via the CAM signal), camshaft position (e.g., as indicated by camshaft sensor 172 via the VCT signal), the position of the output shaft of an electric motor (e.g., electric motor 166) coupled to a camshaft and configured to selectively alter the phase of the camshaft, and the air charge held in a cylinder (e.g., cylinder 30) of the engine. After a finite duration in which the engine is not operational, cranking begins and persists throughout a duration 602, emphasized in FIG. 6 via shading. From the beginning of the drive cycle, until a time 604, camshaft positions from a camshaft sensor (e.g., camshaft sensor 172) are unavailable, while camshaft positions from the motor controller are. As such, from the beginning of the drive cycle until time 604 various engine operating parameters such as cylinder air charge are determined based on the camshaft positions received from the motor controller. Desired camshaft positions determined during this time may be corrected by retrieving a stored camshaft position correction. After time 604, however, camshaft positions from the camshaft sensor become accurate enough for engine control purposes (shown in the figure in dashed lines). Engine operating parameter determination may then take into account both camshaft positions received from the motor controller and camshaft positions received from the camshaft sensor—e.g., by computing the difference between these camshaft positions and deriving a correction with which to correct subsequently determined desired camshaft positions in the manners described above.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a camshaft of an engine in a vehicle, comprising:
   during a first vehicle drive cycle, only after output from a camshaft sensor is determined to be available and sufficiently accurate including after engine speed exceeds a threshold speed and after cranking of the first vehicle drive cycle, determining a correction based on a difference between a camshaft position indicated by the camshaft sensor and a camshaft position indicated by a motor controller coupled to the camshaft, the first vehicle drive cycle terminated with an engine shutdown; and
   during a second vehicle drive cycle following the first vehicle drive cycle, cranking the engine from rest, including while the output from the camshaft sensor is determined to be unavailable and insufficiently accurate, and during the cranking, adjusting the camshaft based on a camshaft position indicated by the motor controller and the correction.

2. The method of claim 1, wherein adjusting the camshaft includes sending a desired camshaft position from an engine controller to the motor controller of a camshaft actuator of the camshaft.

3. The method of claim 2, wherein the camshaft actuator is an electric motor.

4. The method of claim 3, wherein the camshaft position is indicated by an internal encoder of the camshaft actuator.

5. The method of claim 2, wherein a desired camshaft position is further determined based on a difference between the camshaft position indicated by the camshaft sensor and the camshaft position indicated by a camshaft actuator.

6. The method of claim 2, wherein a desired camshaft position is further determined based on one or more engine and/or vehicle operating conditions.

7. The method of claim 1, wherein the camshaft sensor is a variable reluctance sensor.

8. The method of claim 2, wherein the desired camshaft position is further determined based on a temporal comparison of the camshaft position indicated by the camshaft sensor to output from a crankshaft sensor.

9. A method of operating a camshaft, comprising:
   during a first vehicle drive cycle, only after output from a camshaft sensor is determined to be available and sufficiently accurate including after engine speed exceeds a threshold speed and after cranking of the first vehicle drive cycle, the first vehicle drive cycle terminated with an engine shutdown:
      receiving a first camshaft position indicated by a camshaft actuator;
      determining a second camshaft position based on the output from the camshaft sensor and output from a crankshaft sensor; and
      determining a correction based on a difference between the first and second camshaft positions; and
   during a second vehicle drive cycle following the first vehicle drive cycle, cranking an engine from rest, including while the output from the camshaft sensor is determined to be unavailable and insufficiently accurate, and during the cranking, adjusting the camshaft based on camshaft position indicated by the camshaft actuator and the correction.

10. The method of claim 9, further comprising sending a desired camshaft position to the camshaft actuator to thereby position the camshaft at the desired camshaft position.

\* \* \* \* \*